United States Patent
Dimaio et al.

(10) Patent No.: US 6,759,086 B2
(45) Date of Patent: Jul. 6, 2004

(54) METHOD AND APPARATUS FOR APPLYING A POWDERED RESIN TO FASTENERS

(75) Inventors: Anthony Dimaio, Haverhill, MA (US); Mike Arslanouk, Haledon, NJ (US)

(73) Assignee: Nylok Corporation, Macomb, MI (US)

( * ) Notice: Subject to any disclaimer, the term of this patent is extended or adjusted under 35 U.S.C. 154(b) by 0 days.

(21) Appl. No.: 10/640,488

(22) Filed: Aug. 13, 2003

(65) Prior Publication Data

US 2004/0047987 A1 Mar. 11, 2004

Related U.S. Application Data

(62) Division of application No. 10/178,112, filed on Jun. 24, 2002, now Pat. No. 6,648,970.

(51) Int. Cl.[7] .................................................. B05D 3/12
(52) U.S. Cl. ....................................... 427/195; 427/345
(58) Field of Search ................................. 427/180, 181, 427/189, 195, 345, 235, 238, 239; 118/308, 309, 326, 312, 303

(56) References Cited

U.S. PATENT DOCUMENTS

| | | | | |
|---|---|---|---|---|
| 3,918,401 A | * | 11/1975 | Blakeslee | .................. 118/630 |
| 4,291,640 A | * | 9/1981 | Payne et al. | ................ 118/50.1 |
| 4,865,881 A | * | 9/1989 | Sessa et al. | ................. 427/181 |
| 5,571,323 A | * | 11/1996 | Duffy et al. | ................ 118/308 |

* cited by examiner

Primary Examiner—Richard Crispino
Assistant Examiner—Yewebdar Tadesse
(74) Attorney, Agent, or Firm—Niro, Scavone, Haller & Niro.

(57) ABSTRACT

The present invention is directed to an improved method and apparatus for the application of powdered resins to threaded fasteners. In accordance with the present invention, the powdered resin handling system used to apply, collect, recycle and make-up the resin is generally enclosed; that is, with the exception of the application of the resin to the fasteners, the resin is generally maintained within conduit, housings or hoppers that are not open to the surroundings. This tends to minimize discharge of resin into the areas surrounding the fastener processing equipment and also isolates the resin from external environmental conditions that tend to degrade the resin over time. In addition, the present invention introduces fresh, new or make-up resin in a manner that assures intimate and thorough intermixing of the new and recycled resin while minimizing the cost and complexity of the equipment employed for that purpose.

1 Claim, 4 Drawing Sheets

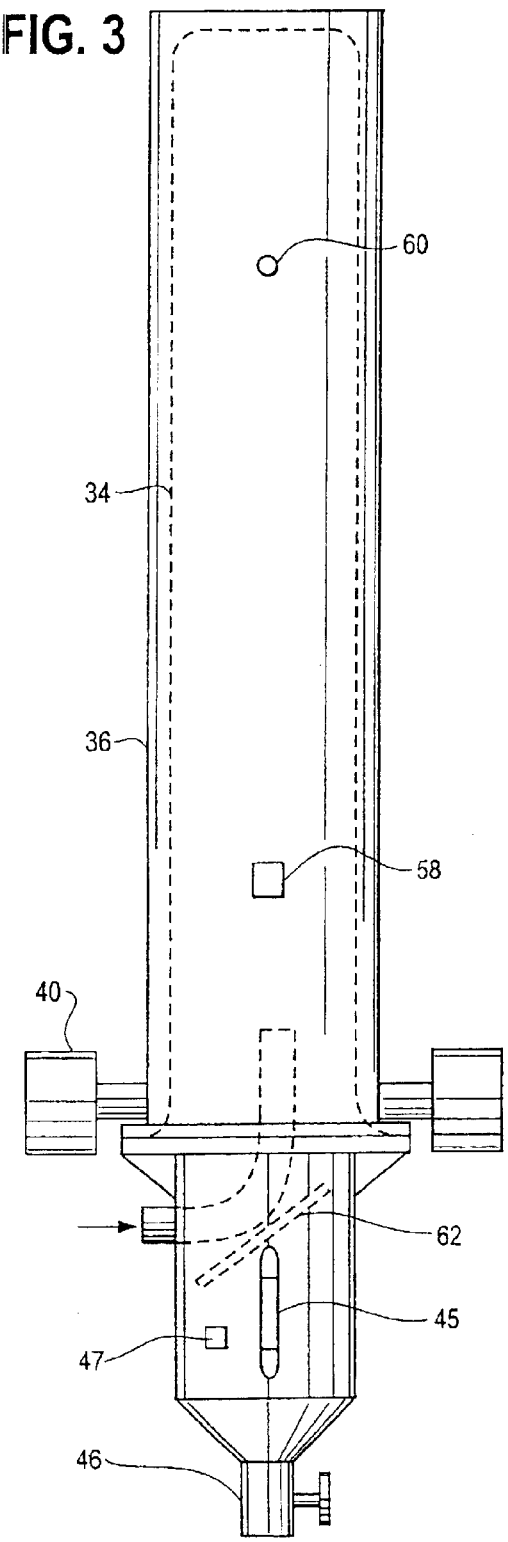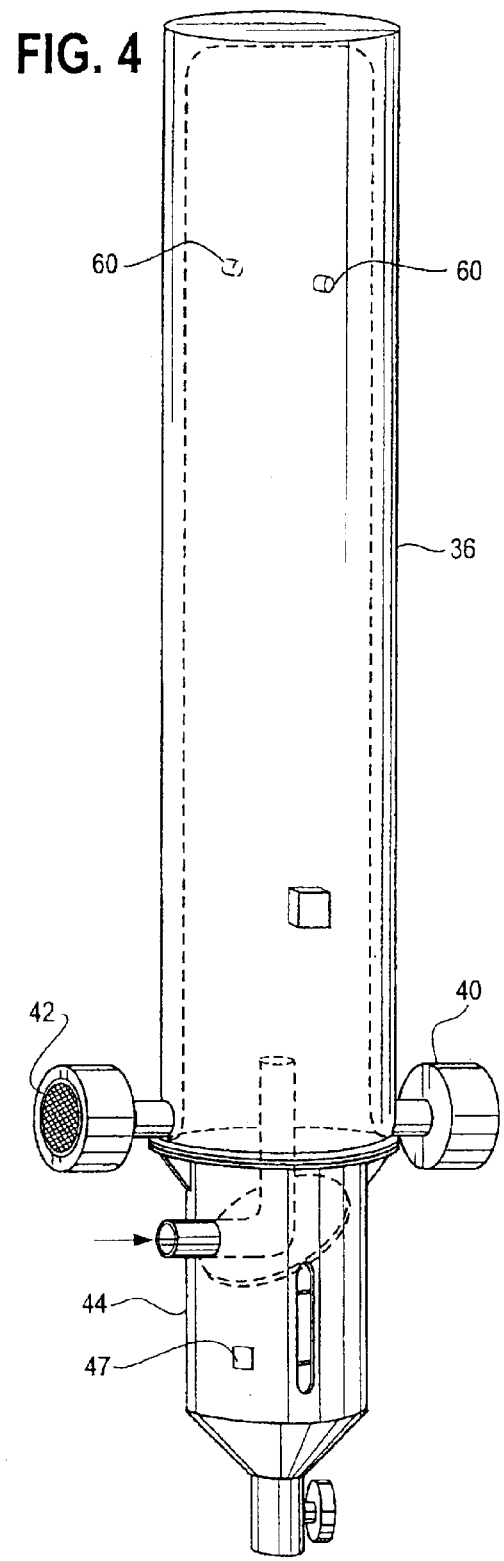

METHOD AND APPARATUS FOR APPLYING A POWDERED RESIN TO FASTENERS

This is a divisional application of prior U.S. patent application Ser. No. 10/178112 filed Jun. 24, 2002, now U.S. Pat. No. 6,648,970.

BACKGROUND OF THE INVENTION

The present invention relates generally to an improved method and apparatus for the application of powdered resins to threaded fasteners. More particularly, the invention relates to improvements in the methods and apparatus used to apply, collect, recycle and make up the powdered resins used in various fastener coating technologies.

There are now known to the art a wide variety of methods and apparatus for the application of resin patches and coatings on threaded fasteners. These patches and coatings perform a variety of functions, including, for example, locking, sealing, masking, and corrosion protection. Examples of typical state of the art methods and apparatus are disclosed in U.S. Pat. Nos. 4,775,555; 4,815,414; 4,842,890; 4,865,881; 5,090,355; and 5,571,323.

Powdered resin handling is an important aspect of this technology. For example, it is necessary to apply the resin uniformly to a large number of individual fasteners in a typical production run, and to maintain generally uniform powder specifications. It is also very desirable to collect and recycle the resin that does not adhere to the fasteners in the application processes. Various powdered resin handling systems are shown in U.S. Pat. Nos. 5,718,945; 5,908,155; and 6,209,758.

One drawback with existing technology, however, is that over time the powdered resin which has been continually recycled tends to degrade and the quality of the resulting patch or coating may be adversely effected.

Another problem associated with the existing technology is that some of the powdered resin may find its way into the immediate surroundings, requiring periodic equipment clean-up and even air cleaning equipment to reduce in-plant airborne resin.

There is also a need to introduce fresh or new powdered resin into the powder handling system, and the existing technology may suffer from the inability to intimately and uniformly mix the new powdered resin with that already circulating within the system or, alternatively, may achieve appropriate mixing but only through the use of costly mixing equipment

SUMMARY OF THE INVENTION

The present invention is directed to an improved method and apparatus for the application of powdered resins to threaded fasteners. In accordance with the present invention, the powdered resin handling system used to apply, collect, recycle and make-up the resin is generally enclosed; that is, with the exception of the application of the resin to the fasteners, the resin is generally maintained within conduit, housings or hoppers that are not open to the surroundings. This tends to minimize discharge of resin into the areas surrounding the fastener processing equipment and also isolates the resin from external environmental conditions that tend to degrade the resin over time. In addition, the present invention introduces fresh, new or make-up resin in a manner that assures intimate and thorough intermixing of the new and recycled resin while minimizing the cost and complexity of the equipment employed for that purpose.

In accordance with one embodiment of the invention, an apparatus is provided for the application of a powdered resin to fasteners comprising: a pressurized air-powered applicator having a pressurized air input and a powdered resin input, said applicator discharging an airborne powdered resin stream; a conveyor positioned to transport a plurality of fasteners through said resin stream; a vacuum nozzle positioned to collect overspray resin from said resin stream; a new resin supply container having a first conduit with a free end positioned to introduce new resin at or adjacent the vacuum nozzle thereby creating a new and recycled resin mixture; a bag collector in communication with said vacuum nozzle; a housing for enclosure of the bag collector, said housing having at least one discharge port for exhausting air passing through said bag collector; and a resin mixture supply container positioned to receive said resin mixture from said bag collector and having a second conduit that communicates with said powdered resin input to said resin applicator.

In accordance with another embodiment of the invention, a method is provided for applying a powdered resin coating onto fasteners comprising the steps of: generating an airborne powdered resin stream from a nozzle; passing a plurality of fasteners through said resin stream to apply said coating; collecting powdered resin overspray from said resin stream by means of a vacuum nozzle; introducing new powdered resin into said vacuum nozzle thereby forming a new and recycled resin mixture; collecting the resin mixture in a bag collector enclosed within a housing and filtering the air discharged from said housing; and transferring the resin mixture from the bag collector to an input to said nozzle.

BRIEF DESCRIPTION OF THE DRAWINGS

These and other features, objects and advantages of the present invention will become apparent from the following description and drawings wherein like reference numerals represent like elements in several views, and in which:

FIGS. 3 and 4 are side and side-perspective views, respectively, illustrating further construction details of the preferred embodiment relating to the resin collection and storage equipment.

DESCRIPTION OF THE PREFERRED EMBODIMENTS

Figure 1:
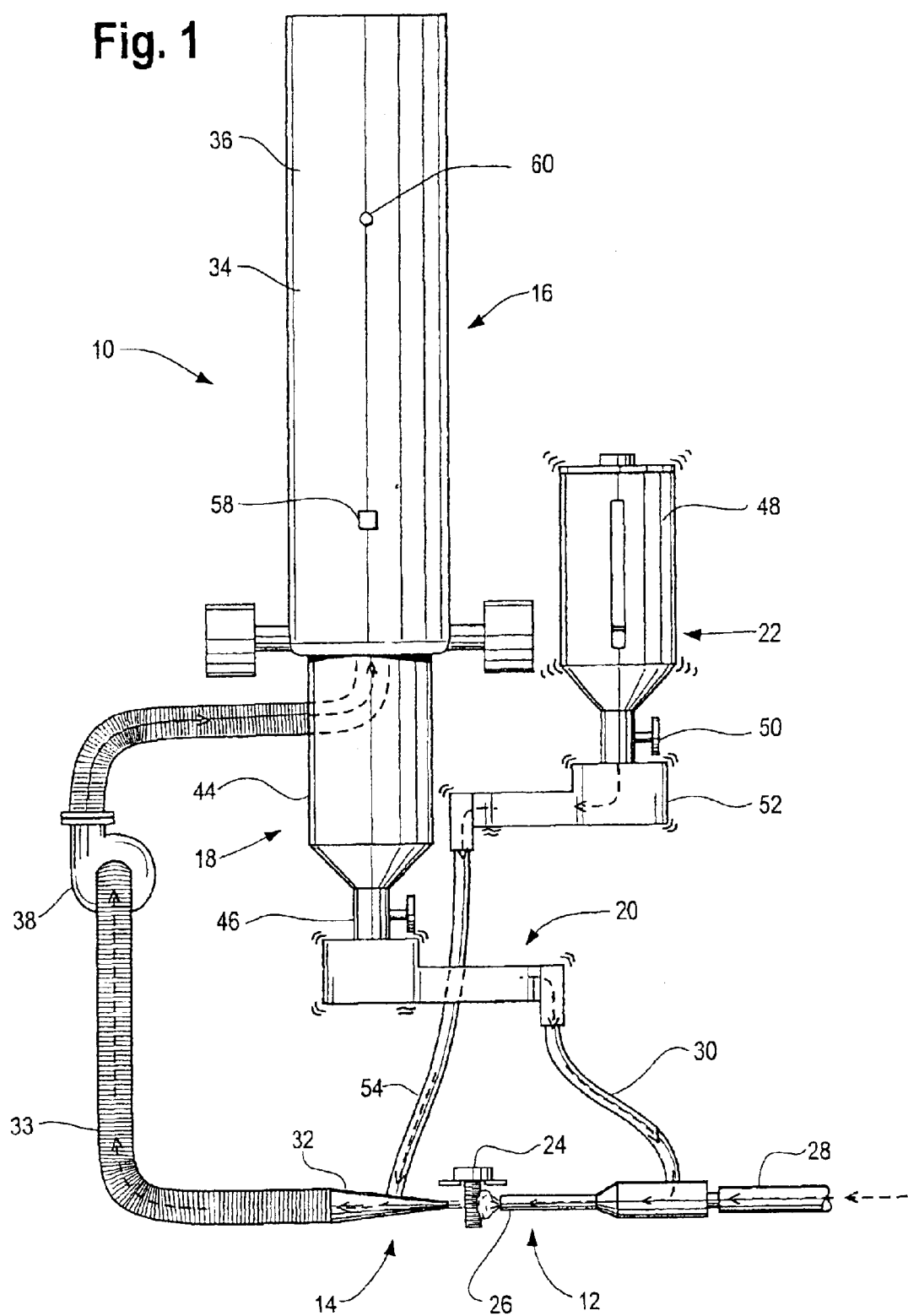
FIG. 1 is a side elevational view showing the overall arrangement of the method and apparatus used in one preferred embodiment of the present invention.

With reference to FIG. 1, an overall apparatus in accordance with one embodiment of the invention is illustrated and designated generally as 10. This apparatus 10 includes a powdered resin applicator 12, a vacuum collector 14, a resin collection system 16 and storage device 18, a recycled resin transfer mechanism 20, and a new or make-up resin hopper and transfer mechanism 22.

As is well known in the art, the fasteners 24 to which the powdered resin is applied may be transported through the resin application station by a variety of conveyors, including belt conveyors, magnetic pin conveyors and both horizontal or vertical carousels or pin-wheels. Typically, the fastener is preheated and is conveyed through a stream of the resin powder which is discharged from one or more pressurized air nozzles 26. A source of high pressure air is connected to the nozzle 26 via conduit 28 and, in a manner well known to the art, powdered resin is aspirated into the nozzle from resin input conduit 30.

As the fasteners pass through the resin stream emanating from nozzle 26, the resin that impinges upon the heated fasteners will melt and adhere to form the desired patch or coating. Oversprayed resin is collected by vacuum nozzle 32 and is conveyed via conduit 33 to a bag collector 34 (see FIGS. 3 and 4) within housing 36. The vacuum at nozzle 32 and air flow necessary to transport the resin to bag collector 34 are generated by fan 38.

Figure 2:
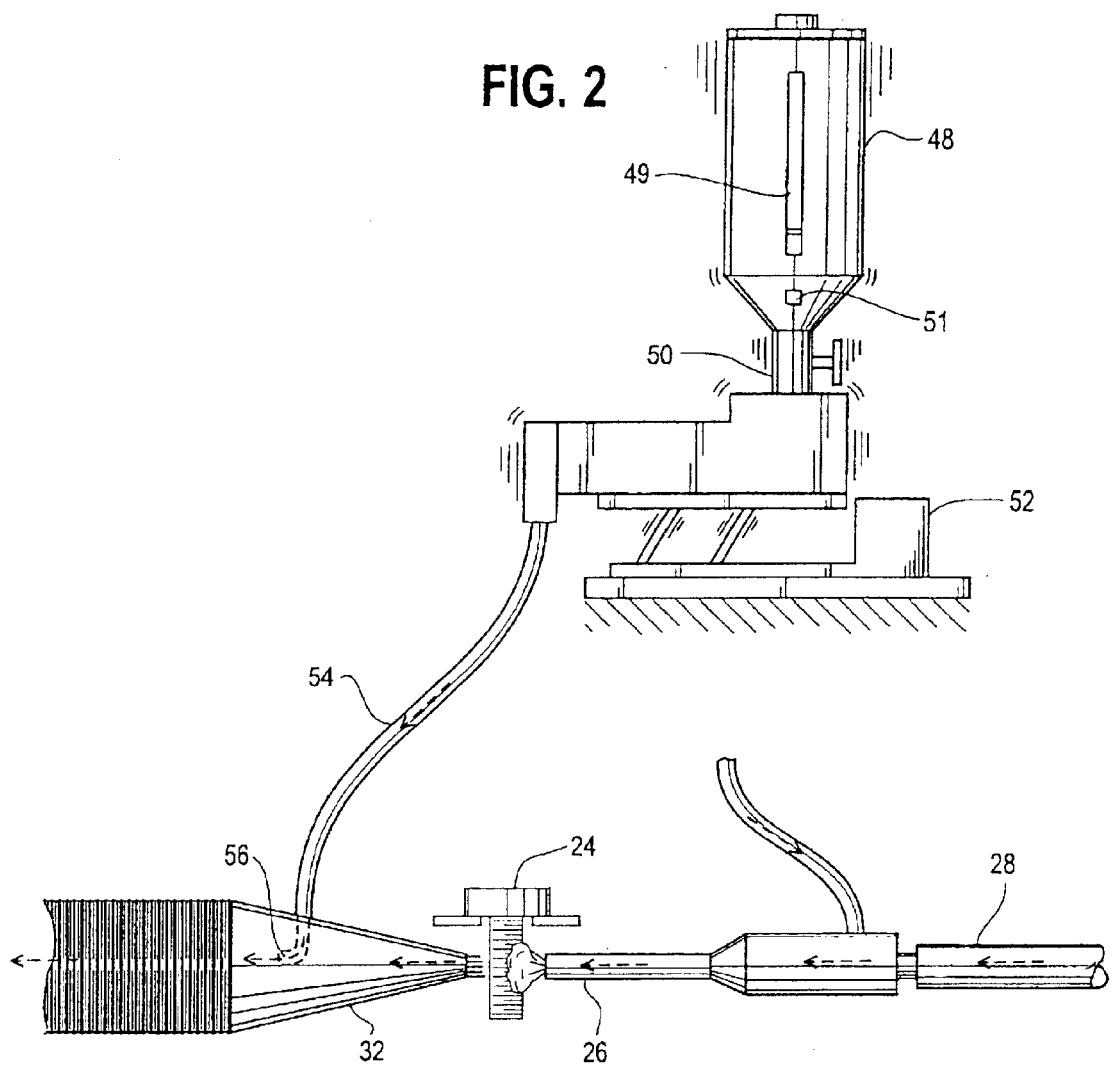
FIG. 2 is another side view, in partial cross-section, illustrating details of the preferred embodiment relating to introduction of new or make-up resin into the powder handling system.
Figure 2A:
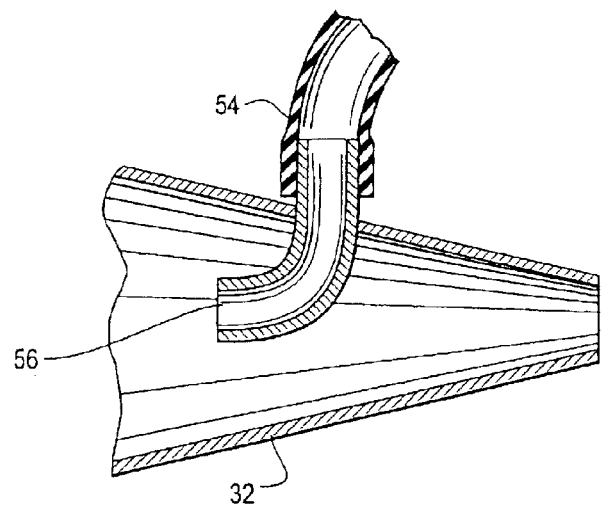
FIG. 2A is an enlarged partial cross-sectional view of the vacuum collector and new powdered resin feed in accordance with one preferred embodiment of the invention.

New powdered resin, or in some cases, a specifically formulated make-up resin, is stored in new resin storage hopper 48 and is gravity-fed through transfer valve 50 into powder transfer device 52 which is vibrated in a conventional manner to deliver powdered resin to new powder input conduit 54. Hopper 48 may include a powder level inspection window 49 or, alternatively, a sensor 51 that activates an audible and/or visual alarm when the powdered resin within hopper 48 falls below a preselected minimum level. As illustrated in FIG. 2, conduit 54 terminates at an end 56 within vacuum nozzle 32, or alternatively within conduit 33 adjacent to vacuum nozzle 32, so that the new resin is intimately and uniformly mixed with the recycling resin as it passes through nozzle 32.

The bag collector 34 separates the recycled and new resin mixture from the air flow and exhaust air exits the bag housing 36 via discharge ports 40. Preferably, each discharge port 40 is fitted with a filter 42 to remove any resin fines that may pass through bag collector 34. Filters 42 may be any of a variety of well known filters and filter media. For example, filter elements sold by McMaster-Carr part no. 4401K19 with polyester media part no. 4399K53 have been found satisfactory.

The powdered resin mixture then drops from bag collector 34 into recycled resin storage hopper 44 and is gravity-fed through valve 46 into a powder transfer device 20 which is described in greater detail below. The powdered resin discharged from transfer device 20 is conveyed via conduit 30 to applicator 12.

Hopper 44 may be equipped with a visual inspection window 45 or, alternatively, with a sensor 47. Sensor 47 is designed to actuate resin transfer device 52 when the resin level in hopper 44 falls below a preselected minimum level. Sensor 47 also will deactivate transfer device 52 when the resin within hopper 44 rises above a preselected maximum level.

As shown in FIGS. 3 and 4, the bag collector housing 36 may be fitted with a mechanical or air-powered vibrator 58 which is periodically actuated to discharge resin powder from bag collector 34. In addition, at least one, and preferably two, high pressure air input ports 60 are positioned at diametrically opposed locations on the side wall of housing 36 and are periodically and alternately actuated to direct a high pressure air stream against one side of bag collector 34 and then the other, to assist in dislodging resin from the inside of the bag collector. A baffle 62 is disposed in the upper area of storage hopper 44 to minimize air turbulence within hopper 44 while still allowing the resin to fall into the hopper from bag collector 34.

Figure 5:
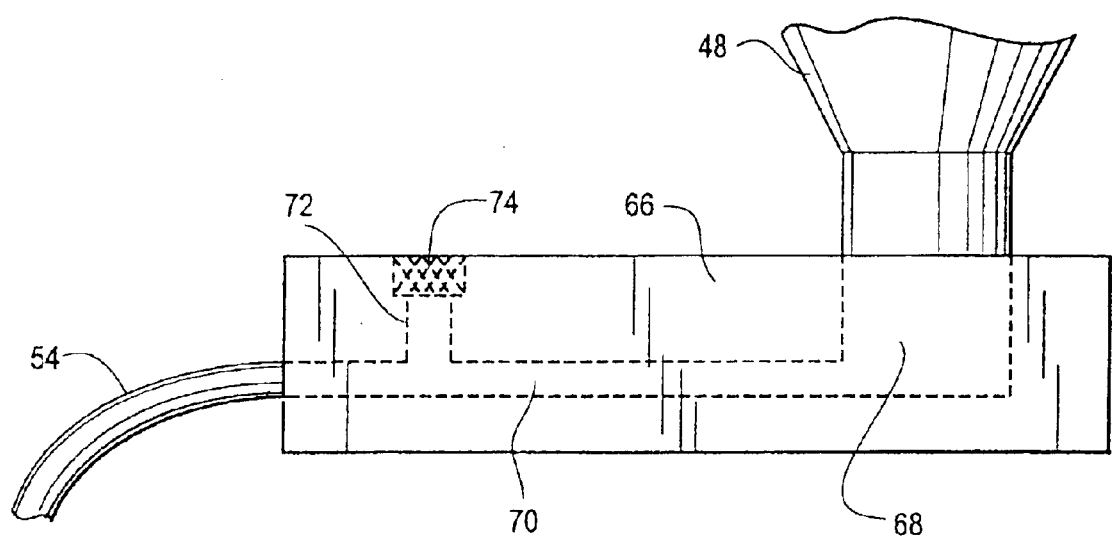
FIG. 5 is a side elevation showing construction details for one preferred form of a resin transfer mechanism used in the preferred embodiment of the invention.

FIG. 5 illustrates a preferred powdered resin transfer device that may be employed for transfer device 52. The device illustrated in FIG. 5 includes a housing 66 having a passageway 68 adapted to receive the discharge chute of the powdered resin hopper. A powder transfer chamber 70 communicates at one end with passageway 68 and receives a powder conduit (i.e. conduit 54) at its opposite end. An air relief port 72 which communicates with chamber 70 is fitted with filter 74 and operates to relieve or control any vacuum that might otherwise develop by reason of the airflow passing the discharge end 56 of conduit 54. A suitable porous bronze filter element for filter 74 is supplied by McMaster-Carr under part no. 4450K2. This transfer device may also be employed for conveying powder from hopper 44 to nozzle 12. An apparatus such as disclosed in U.S. Pat. No. 6,209,758 is also useful for transfer devices 52 and/or 20, particularly where the equipment is adapted for use with more than one applicator nozzle 12. Preferably, the powder transfer devices are operated using an in-line vibratory driver with an adjustable controller for varying the powder flow rate in a manner well known to those of skill in the art.

In operation, the powdered resin overspray (i.e. the resin not applied to the fastener) is collected via vacuum nozzle 14 and new or make-up resin powder is simultaneously fed into the recycled resin as it passes through the vacuum nozzle. This new and recycled resin mixture is then conveyed to the enclosed collector bag and storage hopper for reuse as the resin source for applicator nozzle 12. With the exception of the resin's passage from the applicator nozzle 12 to vacuum nozzle 14, the powdered resin handling system is substantially enclosed, thus, minimizing resin contamination by environmental conditions.

Also, maintaining the bag collector 34 within housing 36 reduces the discharge of resin "fines" into the area surrounding the equipment, thereby reducing airborne resin and the need for periodic clean-up.

The invention may be employed with any of the powdered resins well known in the art, including polyamides, fluoropolymers, and polyolefins. When nylon patches are formed on prevailing torque type fasteners, a nylon powder is employed and the new resin may be formulated, in a manner well known in the art, to include moisture absorbing compounds in addition to new or virgin nylon. One such suitable make-up composition has been formulated using a 60 to 1 ratio of nylon powder and a composition marketed by Rohm and Haas under the trade designation "Master Batch."

While the invention has been described with reference to the preferred embodiments thereof, it will be appreciated that numerous variations, modifications, and alternate embodiments are possible including the use of the apparatus with objects other than fasteners. Accordingly, all such variations, modifications, and alternate embodiments are to be regarded as being within the spirit and scope of the invention.

We claim:

1. A method for applying a powdered resin coating onto fasteners comprising:

generating an airborne powdered resin stream from a nozzle;

passing a plurality of fasteners through said resin stream to apply said coating;

collecting powdered resin overspray from said resin stream by means of a vacuum nozzle;

introducing new powdered resin into said vacuum nozzle thereby forming a new and recycled resin mixture;

collecting the resin mixture in a bag collector enclosed within a housing and filtering the air discharged from said housing; and transferring the resin mixture from the bag collector to an input to said nozzle.

* * * * *